C. E. GREENFIELD.
STREET INDICATING DEVICE.
APPLICATION FILED JULY 6, 1908.
938,478.
Patented Nov. 2, 1909.
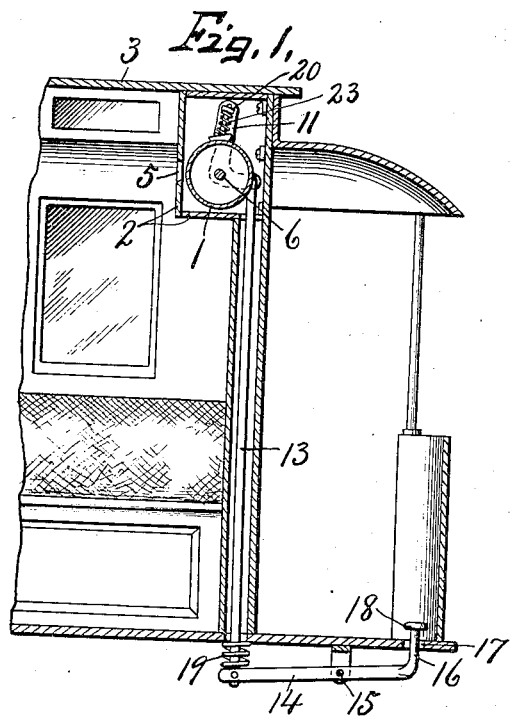
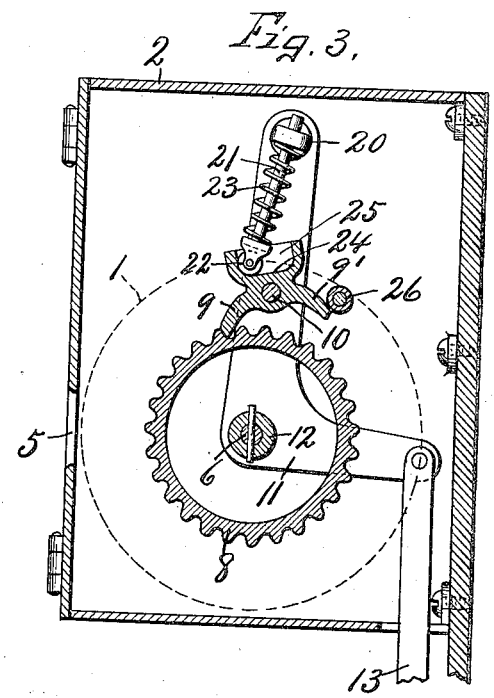
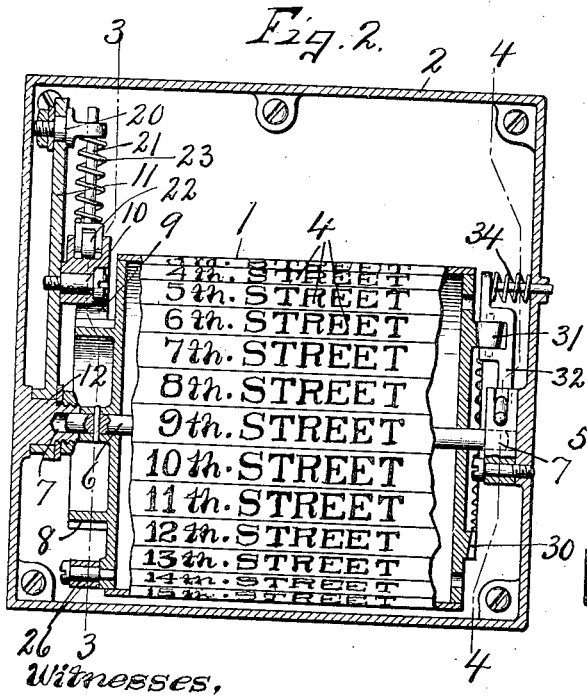
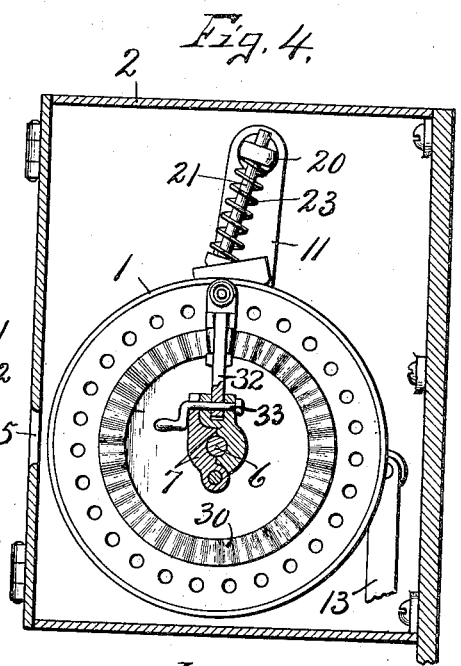
Witnesses,
T. C. Thomas
H. E. Chase
Inventor.
C. E. Greenfield
By.
Howard P. Denison
Attorney.

UNITED STATES PATENT OFFICE.

CLARENCE E. GREENFIELD, OF SYRACUSE, NEW YORK.

STREET-INDICATING DEVICE.

938,478.

Specification of Letters Patent.     Patented Nov. 2, 1909.

Application filed July 6, 1908. Serial No. 442,178.

*To all whom it may concern:*

Be it known that I, CLARENCE E. GREENFIELD, of Syracuse, in the county of Onondaga, in the State of New York, have invented new and useful Improvements in Street-Indicating Devices, of which the following, taken in connection with the accompanying drawings, is a full, clear, and exact description.

This invention relates to certain improvements in street indicators involving the use of a rotary drum bearing upon its periphery a series of street names arranged in sequence, and adapted to be installed in the upper front portion of a street car to be operated by the motorman or conductor to bring the street names successively into registration with a suitable sight opening as the streets are approached during the travel of the car along its route.

The main object is to provide a simple, practical and efficient street indicating device which may be manufactured and installed at a comparatively small cost, and in which the drum bearing the street names may be readily removed and replaced at will without disturbing the operating mechanism so that it may be transferred from one car to another, or substituted by another drum bearing the names of different streets for other routes.

Another object is to provide means whereby the rotation of the drum will be automatically reversed at the end of the route, so that the continued operation of the drum by the same operating means will indicate the successive streets as they are approached by the car, on the return as well as on the outgoing trip.

A further object is to provide means for temporarily holding the drum in its adjusted position after each operation.

Other objects and uses will be brought out in the following description.

In the drawings—Figure 1, is an elevation partly in section, of a portion of one end of a street car showing my improved street car indicating device as installed therein. Fig. 2, is an enlarged elevation partly in section of the street indicating drum and mechanism for holding it in its adjusted position, together with the means for shifting and holding the drum operating pawl to its adjusted position. Figs. 3 and 4, are sectional views taken respectively on lines 3—3 and 4—4 Fig. 2.

In carrying out the objects stated, a drum —1—, is mounted within a suitable inclosing case —2—, in the upper front portion of a street car —3—, and is provided upon its periphery with a series of street names —4— which are movable successively into registration with a suitable sight opening —5— in one side of the case —2—, said street names being arranged in sequence corresponding to the location of the streets along the route over which the car travels. The periphery of the drum is divided circumferentially into equal spaces, corresponding to the number of streets, each space receiving a name so that when operated one street space at a time in passing over the route, the last operation at the end of the route will cause the operating mechanism to reverse the direction of the rotation of the drum for indicating the names of the streets, on the return of the car over the same route. This drum is preferably mounted upon a suitable shaft —6— having its ends journaled in bearings —7— in such manner that the shaft with the drum thereon may be readily removed when desired, and another drum bearing the names of different streets substituted therefor if it is desired to run the car over another line. The left hand bearing —7—, Fig. 2, is simply a socket into which the adjacent end of the shaft —6— projects. The opposite or right hand bearing, same figure, is composed of two sections hinged together at one side of the shaft and secured by the hinge bolt to the adjacent side of the casing, as best seen in Figs. 2 and 4, said sections being clamped around the shaft by a bolt —33—. This bolt is pivoted in one of the sections of the bearing —7—, and is passed through an open-sided slot in the other section and provided with a lateral offset forming a hand piece by which the offset may be turned into and out of registration with the open-sided slot to clamp the sections together when in one position, and to permit such sections to be opened to allow the removal of the drum shaft therefrom when the offset is registered with the slot.

Secured to one end of the drum —1—, and coaxial therewith is a circular toothed ratchet wheel —8—, having a number of teeth corresponding to the number of street names upon the periphery of said drum, and adapted to be engaged by one or the other of a pair of pawls —9— and —9'—. These pawls are preferably integral or rigid with each other, and are pivoted at —10— upon one arm of a bell-crank lever —11—, which in turn is fulcrumed upon a suitable bearing, —12— coaxial with the drum —1— and has its other arm connected by a link —13— to one end of a pedal lever —14—. This lever —14— is fulcrumed intermediate its ends at —15— to the under side of the platform of the car, and is provided with an upright extension —16— projecting through an aperture —17— in said platform and having its upper end provided with a suitable pedal —18— whereby the front end of the lever may be depressed by the foot of the motorman to operate the bell-crank and pawls —9— and —9'—, which are actuated through the medium of the link —13— said parts being retracted by a suitable spring —19— as best seen in Fig. 1.

The arm of the bell-crank lever —11— to which the pawls —9— are pivoted, is located at the end of the drum to which the ratchet wheel —8— is secured and extends some distance above the periphery of said drum, and upon this upwardly projecting end of the bell-crank is mounted a rock shaft —20— having a transverse opening therethrough in which is movable a vertical plunger —21— carrying at its lower end a roller bearing —22—.

The roller bearing —22— together with the plunger —21— upon which it is mounted is pressed downwardly by a spring —23— against the base —24— of a socket —25— which is formed in the upper side of the body of which the pawls —9— and —9'— form a part. The base —24— of the socket —25— is substantially parallel with the plane of the outer ends of the pawls —9— and —9'—, and when said pawls are tilted to throw one of them into and the other out of engagement with the teeth of the ratchet wheel —8—, the bearing face —24— will be forced to an inclined position, and inasmuch as the roller —22—, is spring pressed downwardly against said bearing base and the latter is disposed transversely of the rocking axis of the pawls and extends some distance to opposite sides thereof, it is evident that under the pressure of the spring —23— the roller —22— will be thrown to one side or the other of a line drawn through the axes of the pawls and the shaft 20 according to which pawl is in operation. In other words, by the tilting of the pawls in the manner hereinbefore described the roller —23— will always be thrown to the side of the pawl which is in operation or in engagement with the ratchet wheel, thereby operating to yieldingly hold said pawl in its operative position.

The size of the drum is just sufficient to take upon its periphery the number of street names over which the car is designed to travel, and the number of the teeth of the ratchet wheel —8— corresponds with the number of street names on the periphery of the drum, while the movement of the bell-crank lever —11— and its operating mechanism, as the pedal —14— are adjusted so as to cause the pawl —9— or —9'— to move the drum one tooth or name space at a time, thereby causing practically one complete revolution of the drum during the travel of the car from one terminal to its other terminal.

In order that the direction of movement of the drum may be reversed automatically at the end of the route, I provide the end of the drum adjacent to the gear —8— with a laterally projecting stud or roller —26— which travels with the drum in a circumferential path in which the pawls, —9— and —9'— are located, so that as the drum is rotated step by step, to indicate the successive streets along the line of travel of the car, the stud or roller —26— will be brought into temporary engagement with the inactive pawl, as in this instance —9'—, during the last operation of the drum or at the end of the route, thereby throwing the pawl —9'— into engagement with the teeth and tripping the opposite pawl at the same time, causing the detent —22— to shift its position to hold the pawls in their last adjusted position ready to rotate the drum in the reverse direction, to indicate the names of the streets in reverse order as the car returns over the same route.

In order that the drum may be temporarily held in its adjusted position at each step by step movement, I provide the end of the drum opposite that to which the ratchet wheel is secured with a corrugated annulus —30— having a series of depressions corresponding to the number of teeth in the ratchet wheel, said depressions being adapted to receive a yielding roller —31— which in this instance is mounted in an oscillatory arm —32—, which is pivoted at —33— to the adjacent bearing —7—. The outer end of the arm is free to oscillate to permit the roller —31— to ride successively over the intervening projections, from one space to the other, and is sprung toward the drum by a spring —34—, the drum being held in position by the frictional contact of the roller —31— with the projections in the annulus —30— and together with the arm —32— is rocked from its holding position against the action of the spring —34— by each of the intervening projections of said annulus as the drum is advanced step by step.

In the operation of my invention, as the car approaches each street in succession during its travel over its route, the motorman or other attendant operates the lever —14— by foot pressure upon the pedal —18— against the action of the spring —19— thereby transmitting motion to the bell-crank lever —11— through the medium of the link —13— and causing the operating pawl —9— to move the ratchet wheel and drum secured thereto one tooth space, thereby bringing the street names on the drum successively into registration with the sight opening —5—. This operation is repeated as each street is approached until the car reaches the end of its route, whereupon the stud —26— which was normally positioned in close proximity to the operating pawl —9— in the starting position of the drum is brought into contact with the upper inclined face of the pawl —9'—, so that the last movement of the drum causes the stud —26— to shift the pawl supporting body to trip the pawl —9— and to throw the pawl —9'— into operative position, during which operation the roller 22 is shifted to the opposite side of the line drawn through the axes of the pivot —10— and rock shaft —20— to hold the pawls in their last adjusted position, during the return of the car over the same route. The operation of the bell-crank lever is repeated in the manner described as each successive street is approached thereby rerotating the drum and causing the street names to be successively registered with the sight opening on the return trip of the car.

What is claimed is:—

In a street indicating device, a rotary drum bearing upon its periphery a series of street names arranged in sequence, a ratchet wheel secured to one end of the drum, a corrugated annulus secured to the opposite end of the drum and having its projections corresponding in number to the number of teeth of the ratchet wheel, a pivoted bell crank lever having its axis coincident with that of the drum, a rocking member pivoted to the lever and provided with two pawls movable alternately into and out of engagement with the teeth of the ratchet wheel, a rock shaft journaled on the lever, a plunger having one end slidable transversely through the rock shaft, and its other end movable across and to opposite side of a line drawn through the axes of the drum and said rocking member and spring-pressed into engagement with said rocking member to yieldingly hold the latter in its adjusted position, a stud on the drum moving in the path of the inactive pawl to engage the same and rock said rocking member to throw the inactive pawl into action and thereby throw the active pawl out of action, and at the same time moving the roller on the plunger to the opposite side of said line, means for actuating said bell crank lever to rotate the drum, and a roller spring-pressed against the projections of the corrugated annulus to yieldingly hold the drum in its shifted position.

In witness whereof I have hereunto set my hand this 29th day of June, 1908.

CLARENCE E. GREENFIELD.

Witnesses:
H. E. CHASE,
C. M. MCCORMACK.